NULL TYPE COMPARISON REFLECTOMETER WHEREIN NULLING IS ACCOMPLISHED BY MOVING THE LIGHT DETECTOR

Original Filed March 9, 1966 3 Sheets-Sheet 1

INVENTOR.
PAUL J. SELGIN

BY Alfred E. Miller

ATTORNEY

INVENTOR.
PAUL J. SELGIN

BY Alfred E. Miller

ATTORNEY

INVENTOR.
PAUL J. SELGIN

BY Alfred E. Miller

ATTORNEY

United States Patent Office

Re. 27,270
Reissued Jan. 11, 1972

27,270

NULL TYPE COMPARISON REFLECTOMETER WHEREIN NULLING IS ACCOMPLISHED BY MOVING THE LIGHT DETECTOR

Paul J. Selgin, Bethel, Conn., assignor to Neotec Corporation, Rockville, Md.

Original No. 3,463,596, dated Aug. 26, 1969, Ser. No. 533,034, Mar. 9, 1966. Application for reissue Apr. 17, 1970, Ser. No. 29,652

Int. Cl. G01n *21/48*

U.S. Cl. 356—211 25 Claims

Matter enclosed in heavy brackets [ ] appears in the original patent but forms no part of this reissue specification; matter printed in italics indicates the additions made by reissue.

ABSTRACT OF THE DISCLOSURE

A device for measuring light reflectance or light transmittance in order to obtain color data on both opaque and transparent surfaces. The device utilizes a single photocell or photosensitive element which is activated by the entire light beam reflected from the standard and the test surface in alternate sequence. The device locates the standard and test surfaces approximately equidistant to the photosensitive surface and in close proximity thereto, thereby improving the accuracy of the device.

The present invention relates to a reflectometer in which reflectance of opaque diffusing surfaces for various wavelengths of the visible light spectrum determines the color. Thus, color measurements for such surfaces is essentially a measurement of reflectance. The present device may also employ a series of color filters to obtain color data in the different ranges of the visible light spectrum. In addition, in the case of transparent substances, transmittance is measured instead of the aforesaid reflectance in order to obtain color data thereon and it is within the scope of the present invention to employ the present device to obtain color data on both apaque and transparent surfaces.

The conventional method of measuring reflectance com prises a beam of light of wavelength distribution which is accurately controlled in a well-known manner prescribed by color measurement conventions and other established procedure. This light beam is split in two, with the first part being measured directly, or after reflection from a standard surface which is assumed to be constant. The other part of the light beam is permitted to fall at normal incidence on the test surface. Some of the light reflected from this test surface at an angle of approximately 45 degrees is collected and measured in a conventional manner such as by means of a photosensitive element. The ratio of the values, or the second value when the first has been reduced to a fixed value through "calibration" is used as a measurement of reflectance. As a variant, instead of reading the intensity of the light reflected from the test surface, this may be adjusted to a constant value by means of a variable opening, which is mechanically connected to a vernier or turn counter. The reading obtained on the turn counter is a measurement of reflectance.

Both of the above prior art methods require frequent calibrations which is accomplished by replacing the test surface with a known standard. This is required because of the variation in light intensity for the entire light beam, and for one part in relation to the other, as well as changes in photocell characteristics, both absolute and relative.

In order to overcome the frequent need for calibration in the aforesaid prior art methods, an arrangement has been proposed whereby the same photocell or photosensitive element is activated by the light reflected from the standard and the test surface from the same light beam or from parts of the same light beam, in alternate sequence.

One such prior art method and apparatus illuminates alternately a standard and test surface with parts of the same light beam. An oscillating mirror or prism then directs the reflected light from the standard and from the test surface, in alternate sequence, into a suitable optical arrangement which focuses the reflected light on a single photocell or photosensitive element. In another prior art method and apparatus, the light beam is separated into two parts such that the total light in both parts is constant, but the light of each part alternates from a minimum to a maximum due to mechanical oscillation of a separating bar. One part falls on a standard and the other on a test surface and an additional intercepting member can vary the light falling on the test surface, independently of the oscillation. Reflected light from both test surface and standard surface illuminates a single photocell simultaneously. If the photocell illumination remains constant in time, the system is in equilibrium. Otherwise, a correction is applied by increasing or decreasing the aperture which admits light to the test surface. This correction is applied automatically by a servomechanism which may actuate a counter or a stylus.

It is an object of the present invention to provide an apparatus in which there is no separation of light into two parts falling on the standard and test surfaces respectively, but rather the entire light beam is projected alternately on the standard and test surfaces in succession without any variation in the path followed by the entire light beam. The separation of light, as practiced in prior art apparatus, is not desirable since it is difficult to avoid differences in light transmission over two separate paths. In addition, the present invention constitutes an apparatus without optical means, such as lenses and mirrors, between the reflecting surfaces and the photosensitive surfaces. Furthermore, an advantage of the present invention is to locate the standard and test surfaces in positions which are approximately equidistant to the photosensitive surface and in close proximity thereto, thereby improving the accuracy of the device.

Another object of the present invention is to improve the effectiveness of the method used for obtaining a balance which, instead of using the prior art system of dividing the incident beam into two parts and adjusting one of them to the required intensity, divides an opening into two parts in variable proportion so that both parts vary simultaneously in opposite directions resulting in greater differences in illumination for the same difference in reflectance.

A further object of the present invention is to provide a reflectometer which is relatively simple in construction, in both mechanical and optical design, and is reliably effective for the purposes intended.

The above and other features, objects and advantages of the present invention will be fully understood from the following description considered in connection with the accompanying illustartive drawings.

Figure 1:
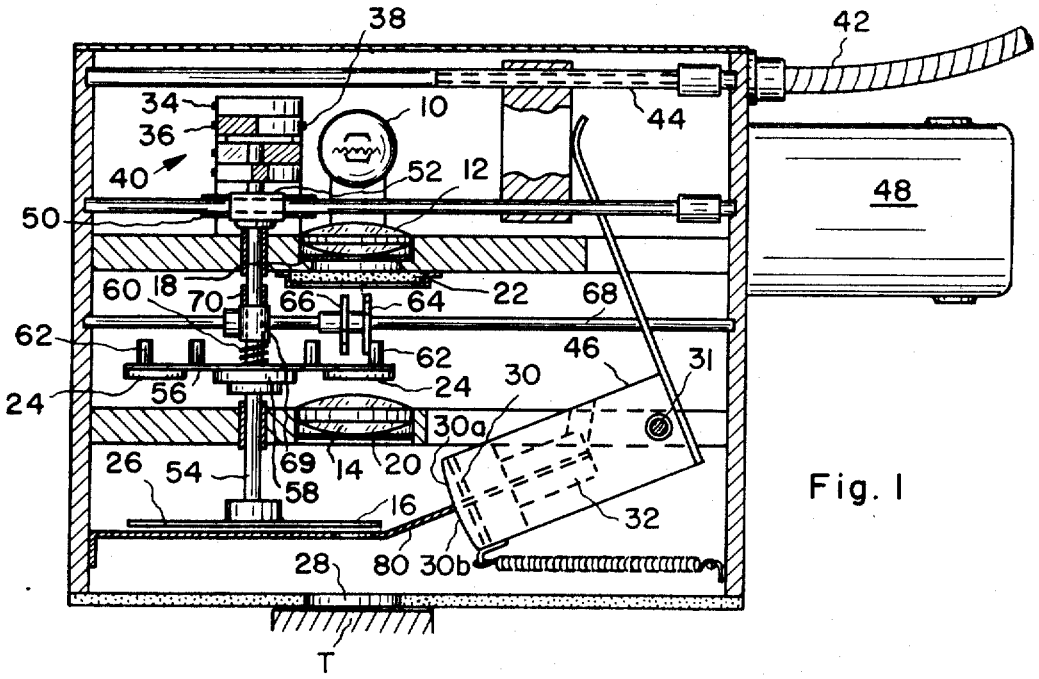
FIG. 1 is a view, partially in section and partially in elevation, of the reflectometer constructed in accordance with the teachings of the present invention.
Figure 2:
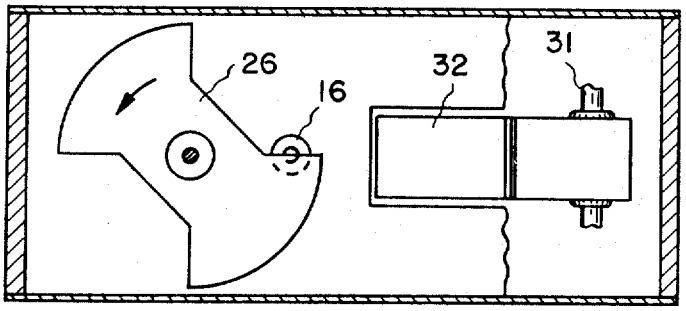
FIG. 2 is a top plan view of rotatable standard surface together with the photoelectric cell mounted on its pivot.

Referring to the drawings and especially to FIGS. 1 and 2, an incandescent light source 10 generates a light beam which is collimated through lenses 12 and 14 and produce a real image of the bulb filament at 16. The light beam is also intercepted by stops 18 and 20, infrared filter 22 and sequential color filters 24. Due to the rotation of white standard surface, the image falls alternatively on the standard surface 26 and the test surface 28, the latter being located below the device. It should be apparent that light reflected from the standard surface 26 illuminates the upper part of opening 30 above separating baffle 80 while light reflected from the test surface 28 enters through the lower part of said opening. Thus, both the upper and lower parts 30a and 30b permit light to fall on the photocell 32 in proportion to the relative size of the two parts.

When the illumination from the two parts of the window 30 is the same, the rotation of standard surface 26 does not result in the fluctuations in output of photoelectric cell 32. Consequently, an equilibrium condition occurs. On the other hand, if a fluctuation condition exists, this is rectified by means of brushes 34, 36 and 38 of commutator 40, the other brushes of the commutator being used to produce a sawtooth voltage and to periodically extinguish a thyratron tube (not shown). The rectified "error voltage" actuates a motor which is in a separate housing (not shown) connected to an apparatus through flexible shaft 42 and a multiple cable (not shown). The separate housing also contains the electrical circuits of the device except for the commutator 40. A lead screw 44 controls the angle of photoelectric cell housing 46 and therefore the relative magnitude of the two parts of the window 30.

While standard surface 26 is rotated by means motor 48 and worm gear 50 together with the worm 52. Said rotation also actuates commutator 40 which is rigidly connected to standard surface 26 through shaft 54.

Sequential color filters 24 are used to obtain colorimetric data, these being related to reflectance of a surface under special illumination. The filters are mounted on a rotatable filter wheel 56 which turns around shaft 54 due to the incorporation of a clutch 58 in the assembly. The clutch 58 is very weak and depends upon the pressure of light spring 60 for activation. A series of studs 62 are mounted circumferentially on filter wheel 56. Notched discs 64 and 66 are rotatably mounted on a shaft 68. Wheel 56 is prevented momentarily from rotating due to the studs 62 interfering with the rotation of said notched discs 64 and 66. The latter rotate at a speed much slower than the speed of rotation of shaft 54 due to the use of worm 69 and worm gear 70.

When the notch in disc 64 permits the upstanding stud 62 to pass therethrough, the stud 62 is further stopped by disc 66 until the notch in said disc allows the stud to pass through said disc. Consequently, the filter wheel 56 will advance about a quarter turn until the next stud abuts disc 64. Filter wheel 56 thus advances in increments; first a small angle and then a large angle. The notches in discs 64 and 66 are spaced so that a large angle step follows immediately after the small angle. The foregoing arrangement constitutes a stepped rotation of the filter wheel with a simple mechanism. Consequently, the filter wheel 56 is stopped momentarily when each of the studs engage one of the discs, thus permitting the light beam to project through the same filter and alternatively on the standard surface 16 and the test surface 28. A cam switch (not shown) operated by shaft 68 generates timing pulses controlling the printing mechanism and paper feed mechanism (not shown) associated with the recording function, when the latter is used in the device.

Figure 3:
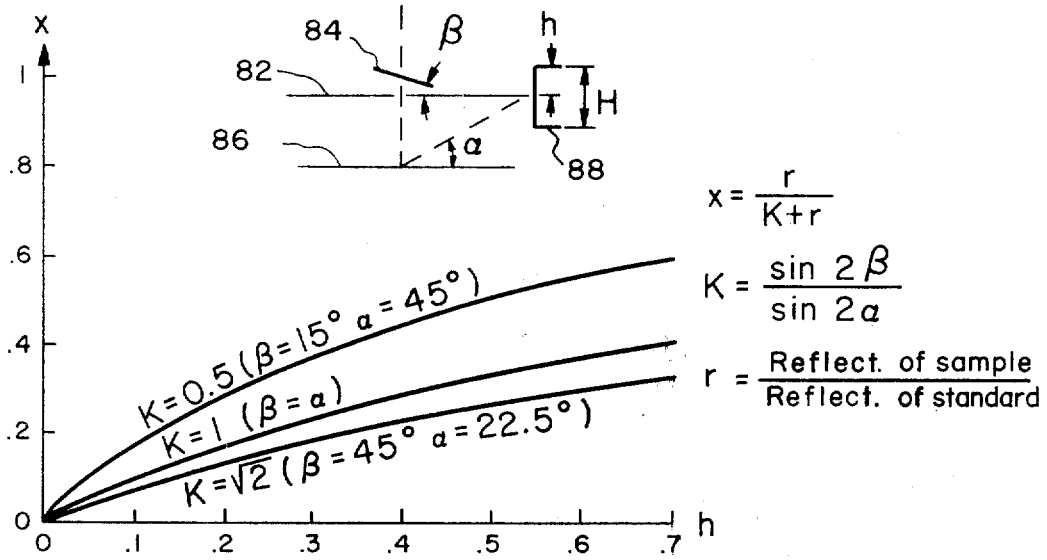

FIG. 3 is a graph showing the relationship between the reflectance and the position of the photosensitive surface of the photoelectric cell.

It should also be noted that the exact position of the image of the filament projected upon the standard [16] *26* is not affected by the rotation of the standard inasmuch as the standard is flat and its upper surface always in the same plane. Therefore, the light entering through the upper part 30a of window 30 may be regarded as a constant quantity, and similarly light entering through the lower part 30b of the window is reflected from a stationary surface. Thus, the two values of light and their mutual correlation are independent of all factors except reflectance values of the standard and test surface respectively. This is not necessarily true of prior art devices. Moreover, the time intervals during which the light spot forms on standard 16 and on test surface 28 respectively do not depend on the exact position of the filament or other extraneous factors due to the geometry of the standard illustrated in FIG. 2.

Figure 4:
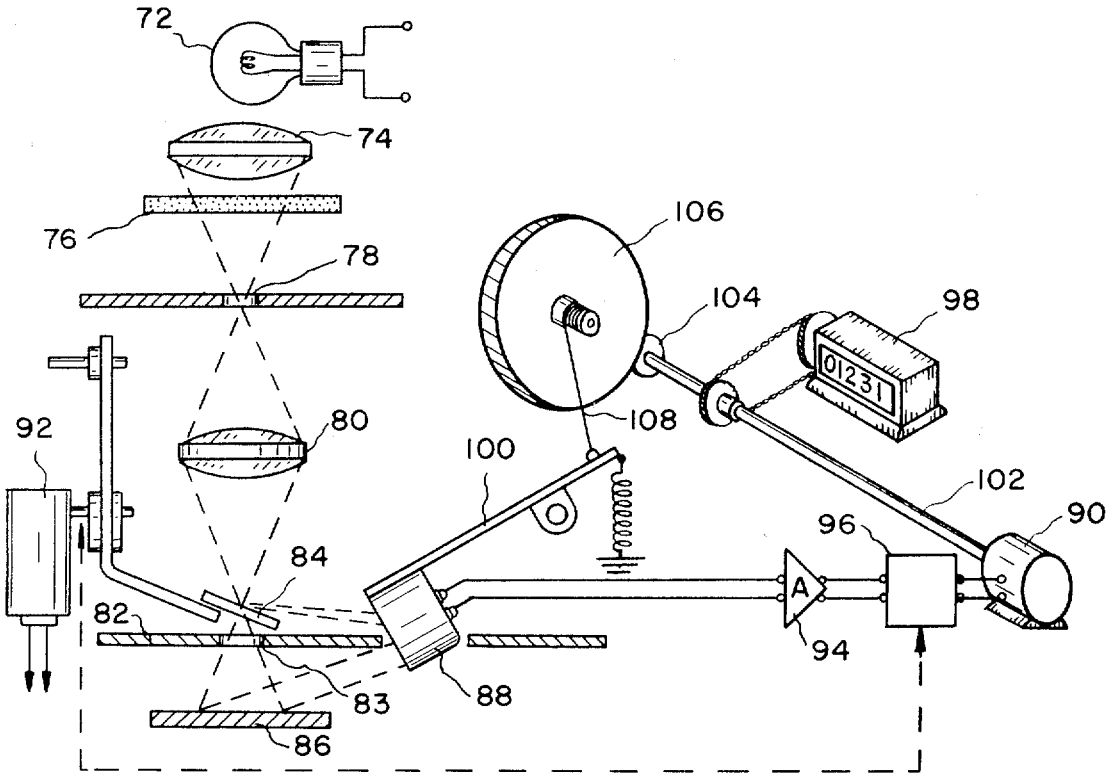
FIG. 3 is a graph showing the relationship between the reflectance and the position of the photosensitive surface of the photoelectric cell and FIG. 4 is a diagrammatic view of an alternate embodiment of the present invention.

FIG. 4 discloses an alternate embodiment of the present invention comprising an incandescent light source 72, a condensing lens 74, a light filter 76, a fixed, substantially circular orifice 78, a projecting lens 80, a light-tight separating structure or baffle plate 82 having an orifice 83, said separating structure permitting no stray or ambient light to pass except through the orifice 83.

A standard surface 84 which is preferably white oscillates in a plane generally perpendicular to the drawing. The sample or test surface 86 is located under the separating structure 82 and a light transducer in the form of photoelectric cell 88 is positioned adjacent to both the standard surface 84 and test surface 86. A servomotor 90 receives the electrical impulses from the photoelectric cell and initiates a series of actions to [be more fully disclosed hereinafter. The motor 92 imparts said] oscillatory motion to the standard surface 84 whereby the latter alternately cuts off the light spot from light source 72 and allows the same to pass through orifice 83.

The circuit of the photoelectric cell includes an amplifier 94 and rectifier 96, the latter rectifying the A.C. signal, if any, received by it that has been generated by the photosensitive element in photoelectric cell 88 and synchronized by mechanical or other means with the oscillations of standard surface 84. A rotary counter 98 is mechanically linked with both the servo-motor 90 and with the spring-loaded, pivoting arm 100. The linkage between servo-motor shaft 102 and pivoting arm [16] *100* takes the form of spur gears 104 and 106 together with a flexible cord 108 wound at one end about the hub of gear 106 and attached at the end to an end of arm 100 remote from the photoelectric cell 88.

Figure 5:
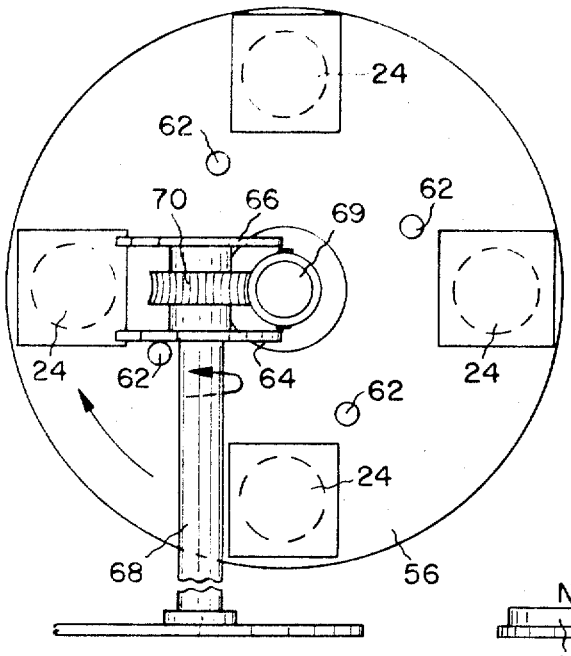
FIG. 5 is an enlarged top plan view of the filter wheel and notched discs coacting therewith, as shown in FIG. 1.
Figure 6:
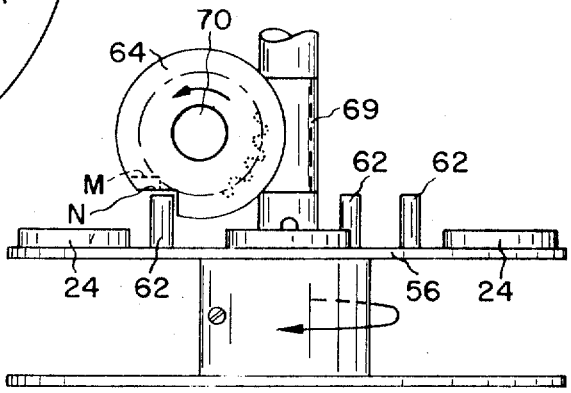
FIG. 6 is a side elevation view of the structure shown n FIG. 5.

FIGS. 5 and 6 illustrate the operation of the structure of the filter wheel 56, studs 62, discs 64 and 66, worm 69 and worm gear 70 in greater detail. The mechanism shown automatically changes the sequential color filters 24 mounted on the filter wheel 56. The filter wheel 56 continually turns in the direction of the arrow until it is restrained by one of the studs 62 moving in its circular path and striking the edge of disc 64. The disc 64 also turns continuously but at a much slower speed than shaft 68 due to the incorporation in the drive arrangement of the worm 69 and worm gear 70. As the disc 64 revolves, the notch N eventually is aligned with one of the studs 62, allowing the same to pass through the disc 64. The same stud 62 is thereafter stopped by the spaced disc 66. The notch M in revolving disc 66 then permits the stud 62 to pass through disc 66. Thereafter, the filter wheel 56 will revolve freely until another stud 62 strikes the disc 64. Two notched discs 64 and 66 are used in order to permit only one stud 62 to pass through the slowly revolving discs at a time.

Figure 7:
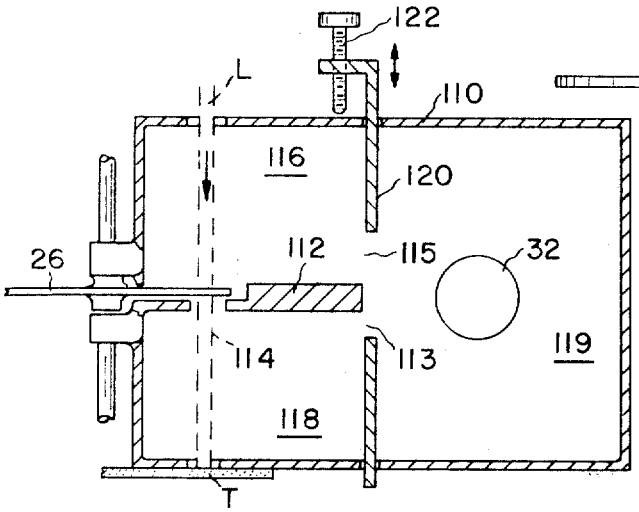
FIG. 7 is diagrammatic sectional view of another embodiment of the present invention incorporating a stationary photocell and a movable window arrangement.
Figure 8:
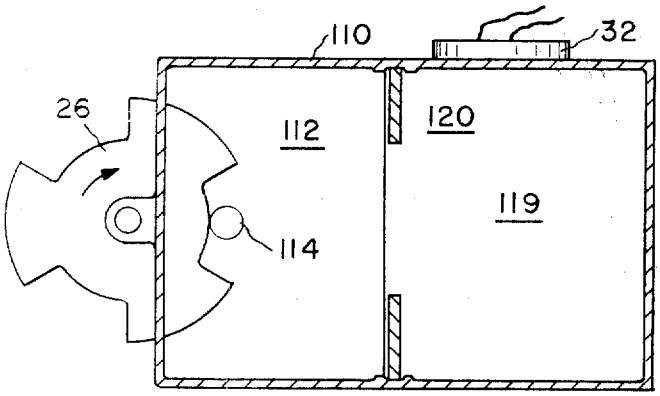
FIG. 8 is another sectional view of the embodiment llustrated in FIG. 7, looking down on the top thereof.

FIGS. 7 and 8 disclose another embodiment of the present invention in which identical structure as that shown in FIG. 1 bears the same reference numerals. In the illustration of FIGS. 7 and 8 the photocell 32 is stationary in the enclosure 110 while the partition 120 moves vertically in order to balance the light flow from the test surface T and standard surface 26 through the openings 113 and 115 respectively. Baffle plate 112 together with the partion 120 forms the "window" for the present device.

A light beam L enters chamber 116 and passes through hole 114 in the baffle plate 112 without restriction and on to the test surface T unless the light beam is intercepted by the vanes of the rotating disc 26 (FIG. 8). Chamber 116 is coated white while disc 26 is white or neutral. Chamber 118 is coated black if the reflectance of the test surface T is to be measured at 45 degrees with normal incidence in accordance with I.C.I. standards. Modifications of the present arrangements are used for reflectance measurements in any particular direction, overall reflectance or transmittance. The partition 120 is vertically movable on a screw 122 by any suitable means, either manually or by a servomechanism drive. The interior of the chamber 119 may also be coated white and the light collected by the photocell 32 may be reflected from the walls of the chamber 119 or may come directly through openings 113 or 115. The light input may fluctuate periodically with frequency determined by the speed of the rotating disc 26 and the number of vanes thereon. Rectification of the photocell signal is achieved as set forth hereinbefore and illustrated in FIGURE 4. Light entering chamber 119 through the upper chamber 116 and opening 115 comes only from rotating disc 26 while light entering chamber 119 from the lower chamber 118 and opening 113 comes from the test surface T. The position of the partition 120 and consequently the baffle 112 affects the proportion between photocell exposures to discs 26 and test surface T respectively. When this proportion is in inverse ratio to the two reflectances the two flows are equal and the photocell output remains constant in time. Therefore, the position of the partition 120 is a measurement of the reflectance of the test surface T.

What I claim is:

1. A reflectometer for comparing the light reflected from a test surface with the light reflected from a standard surface comprising, a light source which directs the light beam toward both of said surfaces, means to move said standard surface into and out of the path of said light beam, said test surface being positioned in the path of said light beam and receiving the same when the light beam is not intercepted by said standard surface, said light beam falling alternately on said standard surface and on said test surface, a light sensitive transducer, a baffle plate located adjacent to said light sensitive transducer, said baffle plate and transducer being adapted for relative movement, said light beam reflected alternately from said test surface and said standard surface to said transducer whereby said baffle plate divides the light sensitive area of said transducer into two parts to permit said entire light beam to fall on said light sensitive parts of said transducer in proportion to the relative size of the parts resulting from said relative movement, a rectifier for rectifying the A.C. signal generated by said transducer, a servo-motor receiving said rectified signal and translating the same into [relation] *relative* movement of said baffle plate and transducer, and means for measuring said movement and thus indicating the comparative reflective values of said test surface with the reflective values of said standard surface.

2. A reflectometer as set forth in claim 1 wherein said transducer is pivoted to respond to the difference between the light reflected from the standard surface and the light reflected from the test surface.

3. A reflectometer as set forth in claim 1 wherein said baffle plate is located below said standard, said baffle plate being provided with an orifice permitting light to fall on said test surface, said test surface receiving light through said orifice when said standard surface is removed from the path of said light.

4. A reflectometer as set forth in claim 3 wherein said transducer is provided with a housing and said baffle plate is light-tight except for said orifice and is so constructed and arranged to permit light reflected from said standard to impinge on said transducer through an opening located on one side of said baffle, and light reflected from said test surface to impinge on said transducer through an opening on another side of said baffle, said openings being variable due to the relative movement of the housing of said transducer and said baffle plate.

5. A reflectometer as set forth in claim 1 wherein said means to move said standard surface into and out of the path of said light beam is a beam chopper which also functions as said standard surface, said beam chopper being a disc having a cutaway portion that is rotated in a plane substantially perpendicular to the path of said light beam.

6. A reflectometer as set forth in claim 1 wherein said means to move said standard surface into and out of the path of said light beam is a beam chopper which also functions as said standard surface, said beam chopper being a plate which is oscillated in a plane substantially perpendicular to the path of said light beam.

7. A reflectometer as set forth in claim 3 further comprising an optical system for focusing said light beam through said orifice.

8. A colorimeter for comparing reflectance of surfaces under special illumination comprising a test surface, a standard surface, a light source, optical means for directing the light beam thereof toward said test surface, means for moving said standard surface into and out of the path of said light beam whereby said light beam falls alternately on said standard surface and said test surface, a plurality of color filters arranged to sequentially intercept said light beam, a baffle plate with an orifice therethrough, said test surface being positioned under said orifice and in the path of said light beam projecting through said orifice, a light sensitive transducer, means mounting said transducer for movement adjacent to said surfaces to respond to the light beam reflected alternately from said standard surface and test surface, a rectifier for rectifying the A.C. signal generated by said transducer, a servomotor actuated by said rectified signal and mechanically connected to said transducer whereby the latter is moved until said unbalance voltage is reduced to zero, and means for measuring said movement of the transducer and thus indicating the comparative reflective values of said test surface with the reflective values of said standard surface.

9. A reflectometer as set forth in claim 2 wherein said means to move said standard surface into and out of the path of said light beam is a beam chopper which also functions as said standard surface, said beam chopper being a plate which is oscillated in a plane substantially perpendicular to the path of said light beam.

10. A colorimeter as set forth in claim 8 further comprising a rotatable filter wheel upon which said filters are mounted, and means on said filter wheel for intermittently stopping the rotation thereof whereby the light beam projects through each of said filters and alternately on said standard surface and on said test surface.

11. A coloimeter as set forth in claim 10 further comprising a pair of slowly rotating spaced, notched discs adjacent to said rotatable filter wheel, and said means on said filter wheel intermitently stopping the rotation thereof are a plurality of spaced studs each intermittently engaging said notched discs and preventing rotation of said filter wheel until the respective stud passes through a notch in said disc.

*12. An apparatus for measuring the reflectance of at*

*ast two surfaces, comprising a source of light in proxnity to said surfaces, means to cause said surfaces to lternately reflect said light, a light-sensitive transducer xposed to the reflected light pattern from each of said urfaces, and means for moving said transducer relative o said reflected light patterns to vary the relative exposure f said transducer to said reflective light patterns.*

*13. The apparatus as set forth in claim 12, wherein aid transducer is in the form of a photocell.*

*14. The apparatus as set forth in claim 12, further comrising means responsive to outputs from said transducer or indicating the comparative reflective values of said urfaces.*

*15. The apparatus as set forth in claim 12 wherein said neans for moving said transducer is adapted to move said ransducer in response to differences in the intensity of aid reflective light patterns.*

*16. The apparatus as set forth in claim 15 wherein the utputs from said transducer are in the form of A.C. sigals, and wherein said means for moving said transducer omprises means for rectifying said A.C. signals and a ervo-motor for receiving said rectified signals and transuting same into said movement.*

*17. The apparatus as set forth in claim 15 wherein said ransducer is pivoted in response to said differences in ntensity of said reflected light patterns.*

*18. The apparatus as set forth in claim 12 wherein aid source of light is adapted to direct a light beam toards said surfaces, and wherein said means to cause said urfaces to alternately reflect said light comprises means to nove one of said surfaces into and out of the path of said ight beam, the other surface being positioned in the path of aid light beam to receive same when the light beam is ot intercepted by said one surface.*

*19. The apparatus as set forth in claim 18, further comrising a baffle plate located between said surfaces, said affle plate being provided with an orifice permitting ight to fall on said other surface.*

*20. The apparatus as set forth in claim 19 further comrising an optical system for focusing said light beam hrough said orifice.*

*21. The apparatus as set forth in claim 18 wherein said ne surface is in the form of a disc having a cutaway*

*portion that is rotated in a plane substantially perpendicular to the path of said light beam.*

*22. The apparatus as set forth in claim 18 wherein said one surface is in the form of a plate which is oscillated in a plane substantially perpendicular to the path of said light beam.*

*23. The apparatus as set forth in claim 12 further comprising a plurality of color filters arranged to intercept said light before it is reflected by said surfaces.*

*24. The apparatus as set forth in claim 23 further comprising a rotatable filter wheel upon which said filters are mounted, and means on said filter wheel for intermittently stopping the rotation thereof whereby said light projects through each of said filters towards said surfaces.*

*25. The apparatus as set forth in claim 24 further comprising a pair of slowly rotating spaced, notched discs adjacent to said rotatable filter wheel, and wherein said means on said filter wheel for intermittently stopping the rotation thereof comprises a plurality of spaced studs each intermittently engaging said notched discs and preventing rotation of said filter wheel until the respective stud passes through a notch in said disc.*

References Cited

The following references, cited by the Examiner, are of record in the patented file of this patent or the original patent.

UNITED STATES PATENTS

| | | | |
|---|---|---|---|
| 2,766,653 | 10/1956 | Martin et al. | 356—212 |
| 3,340,764 | 9/1967 | Bergson | 356—177 |
| 3,363,108 | 1/1968 | Spurr et al. | 356—195 |
| 3,437,411 | 4/1969 | Rudomanski et al. | 356—89 |
| 3,224,319 | 12/1965 | Robert et al. | 250—234 |
| 3,363,108 | 1/1968 | Spurr et al. | |

WILLIAM L. SIKES, Primary Examiner

O. B. CHEW II, Assistant Examiner

U. S. Cl. X. R.

250—204; 356—212, 243